Sept. 29, 1931.  C. C. WORTHINGTON  1,825,109
LAWN MOWING APPARATUS
Filed Nov. 28, 1927  4 Sheets-Sheet 1
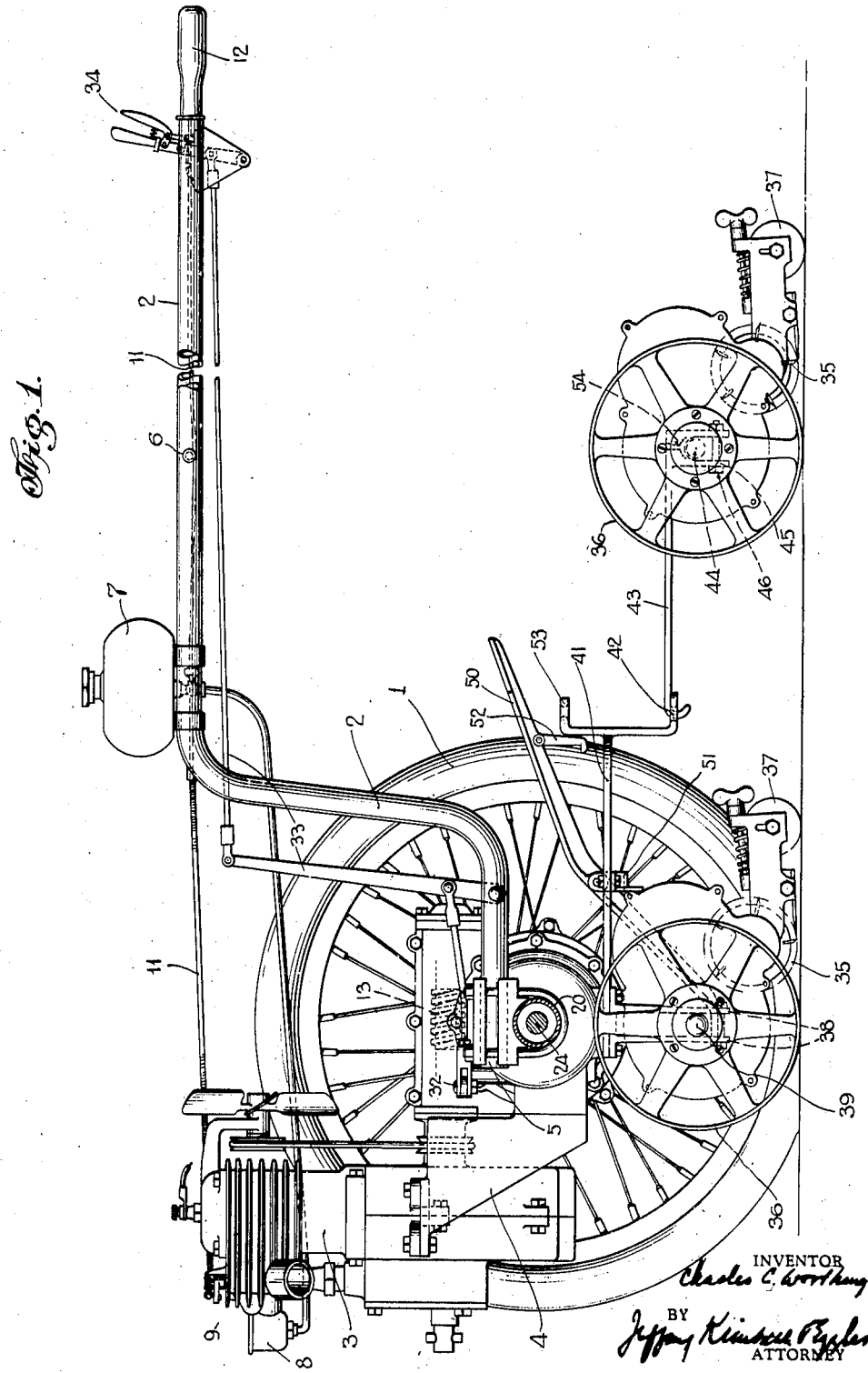

Sept. 29, 1931.  C. C. WORTHINGTON  1,825,109
LAWN MOWING APPARATUS
Filed Nov. 28, 1927   4 Sheets-Sheet 2
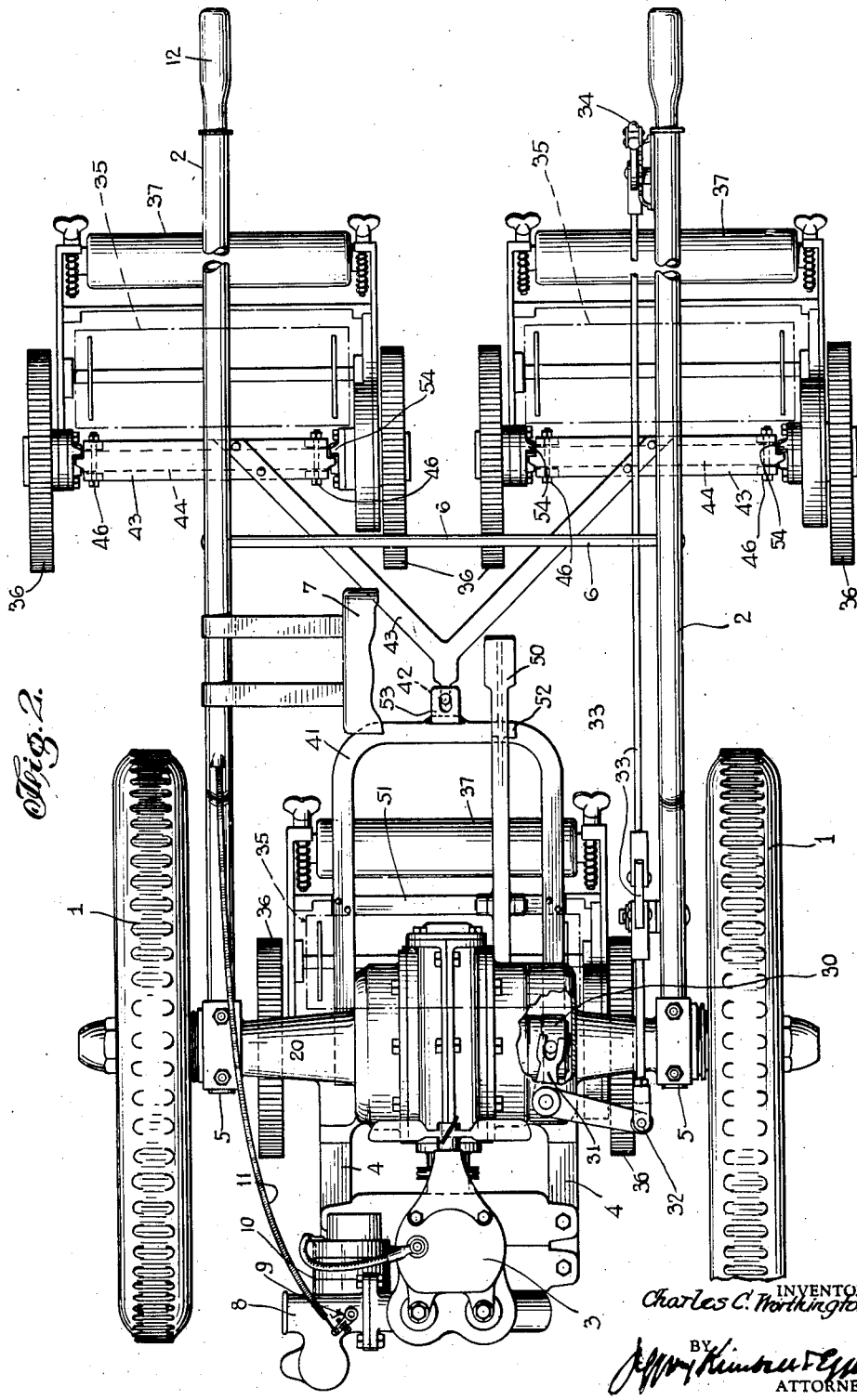

Sept. 29, 1931.  C. C. WORTHINGTON  1,825,109
LAWN MOWING APPARATUS
Filed Nov. 28, 1927    4 Sheets-Sheet 3
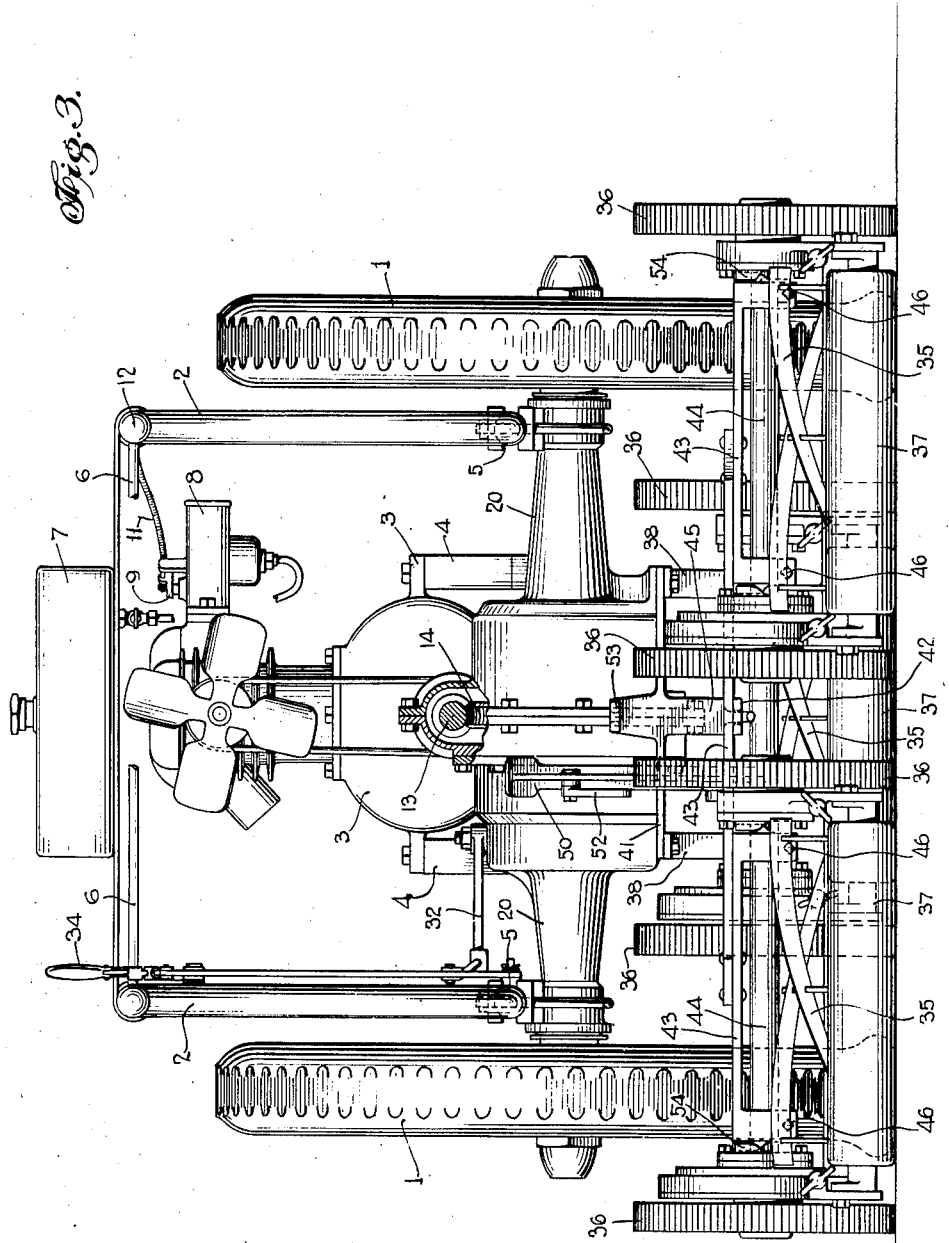

Sept. 29, 1931. C. C. WORTHINGTON 1,825,109
LAWN MOWING APPARATUS
Filed Nov. 28, 1927 4 Sheets-Sheet 4
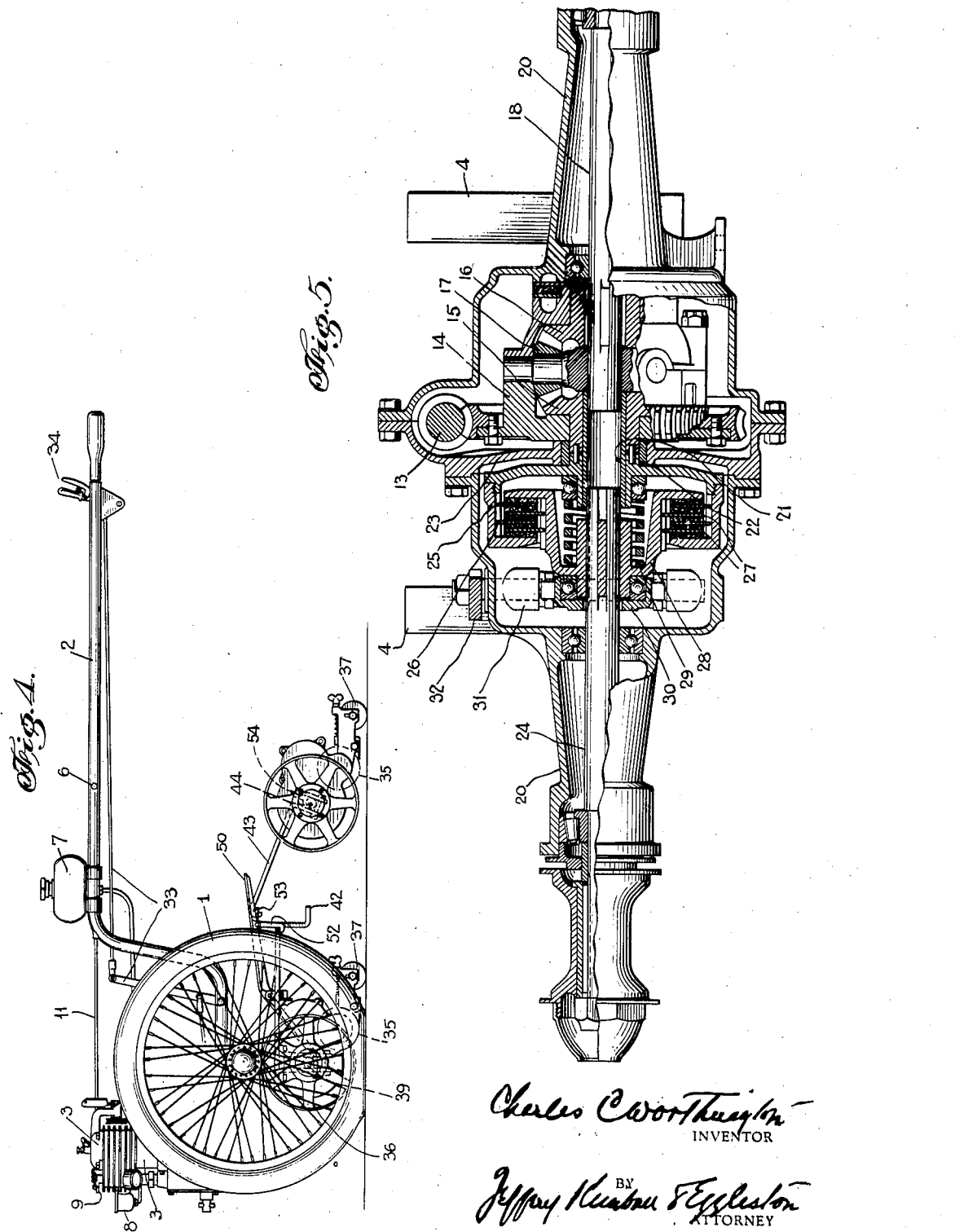
Charles C. Worthington
INVENTOR
BY Jeffrey Kimball & Eggleston
ATTORNEY Patented Sept. 29, 1931

1,825,109

UNITED STATES PATENT OFFICE

CHARLES C. WORTHINGTON, OF DUNFIELD, NEW JERSEY, ASSIGNOR TO WORTHINGTON MOWER COMPANY, A CORPORATION OF DELAWARE

LAWN MOWING APPARATUS

Application filed November 28, 1927. Serial No. 236,107.

This invention is an improvement in lawn mowing apparatus generally, and more especially, power-driven gang lawn mowing apparatus of the so-called walk-type, meaning thereby mowing apparatus which is power-driven and which the operator steers, walking behind, the primary object being a machine of this class suited for mowing the putting greens of golf courses. As well known, such greens require frequent and almost constant mowing and heretofore have been mowed by hand, necessarily, because no practical power machine has been available which could be used on the delicate turf of a putting green without so deforming the surface as to deflect the roll of a putted ball if not to ruin the green completely. The proper maintenance of putting greens has thus consumed an unduly large proportion of the labor expense in operating a golf course, an expense now greatly reduced by this invention which offers the advantage of mowing a wide swath by power and without any harmful effect whatever on the surface of a putting green. To this particular end the invention comprises a novel organization of gang mowing and tractor mechanism, the traction means whereof has a tread surface which makes a large area contact with the grass surface and is non-slipping and also adapted, by reason of its soft and yielding nature, to adapt itself to all slopes and rolls of the green and without injury, as stated.

The invention also involves independent principles of improvement in the traction mechanism and its control and the organization therewith of mowing mechanism or lawn mower units, all of which principles are incorporated in the single putting-green-mower combination shown in the accompanying drawings, the form of the invention at present preferred, but such principles are not to be understood as limited to this form because certain of them are capable of use in other relations, independently of the others as will appear below and from the claims.

Figure 1 is a vertical longitudinal section showing the motor and mowing mechanism in elevation and certain parts in section.

Figure 2, a top plan.

Figure 3, a rear elevation.

Figure 4, a side elevation in smaller scale showing the units placed in their non-working position, and Figure 5 is a longitudinal vertical section, in larger scale, through the axle and clutch structure.

The illustrated machine comprises a pair of main or traction wheels 1, supporting an intermediate housing, herein called the axle structure, to which a pair of rearwardly-extending handle bars 2 are rigidly attached. These bars constitute the means for guiding the course of the motor-driven traction wheels and they also serve as means to support the axle structure to hold the engine in its normal upright position on the axis of the wheels. They are clamped at 5 to the ends of the axle structure adjacent the wheels and thence extend upwardly and then rearwardly at a level which is hand-high, so that the operator, walking between them, naturally holds them in horizontal position. The propelling motor 3 is mounted on brackets 4, formed on, or secured to, the forward side of the axle structure, so that its weight partly counterbalances the weight of the handle means and parts thereon, giving the operator only a moderate load to support. The upper portions of the handle bars are cross-braced by a bar 6 and these high parts carry the fuel tank 7 which is thus at a sufficient elevation to provide a gravity fuel feed to the motor and the handle bars also carry the motor controls.

The motor is an internal combustion engine, air-cooled as indicated, and provided with a cooling fan, belt-driven from its crank shaft. It has a carburetor 8, a throttle 9, magneto 10 and other usual engine appurtenances, not shown on the drawings or necessary to be described, since the detail of the motor is no part of the invention; it should be light in weight and is necessarily high speed in order that its fly wheel shall not be too massive. The throttle 9 is or may be controlled by a Bowden wire 11, or the like, which preferably extends from the throttle through the right hand handle bar, which is tubular, and is operated by the rotary hand grip 12, after the manner of throttle control used on motor-cycles. This also is no part of the present invention and is not shown in detail for this reason.

The engine crank shaft, not shown, is parallel with the longitudinal axis of the machine and is coupled to a longitudinal worm 13, through which it drives a worm-wheel 14, constituting the ring gear of a differential unit, which latter drives the two traction wheels, differentially, according to the principle of the drive of automobiles. The differential may be variously designed for this purpose. As shown in Figure 5, the worm-ring-gear 14 is journalled to rotate on the hubs of the two side gears 15 and 16 and its planetary pinions 17 are journalled on the usual spider carried by it between the side gears. The right-hand side gear 16 is keyed directly to the inner end of the right-hand live axle 18, which latter is journalled in the axle housing 20 and drives the right traction wheel. The left-hand side gear 15 is journalled on a tube 21 and in a bearing 22 formed in the side wall 23 of the differential chamber. It is connected to the left-hand live axle 24, of the left-hand traction wheel, by means of a friction clutch under the control of the operator.

This clutch is a multiple disc clutch of more or less conventional design, as will be recognized, and is contained in a compartment of the axle structure separated from the differential chamber by the wall 23 just referred to, so that it may be dry-running, while the differential runs in oil as customary. The hub of the outer clutch shell 25 is end-keyed or otherwise connected to the hub of the side gear 15 so as to be driven thereby and it is journalled in the partition or chamber wall 23; its clutch discs which are splined to it are marked 26. The intermediate clutch discs 27 are splined to the inner shell or driven member 28 of the clutch, which latter is splined by its hub to the live axle 24 of the left-hand wheel. Only four clutch discs are shown for convenience of illustration. The clutch spring 29 urges the driven shell 28 and the several discs into frictional and driving engagement and said member 28 can be moved by the operator in the opposite direction to open the clutch by means of its clutch collar 30 and clutch fork 31, the latter being carried on a vertical rock shaft which is operated by a crank arm 32 fixed thereon outside of the axle structure 20. This arm 32 is connected by a suitable lever and link system, marked 33, with a clutch handle 34 mounted on the left handle bar, which linkage can be housed inside the tubular handle bar if preferred.

By appropriate movement of the clutch handle 34 the discs of the clutch may be engaged or disengaged as desired and when disengaged or open, the motor drive to both traction wheels is interrupted. At such time it will be understood that the rotation of the ring gear 14 has no other effect than to revolve the planetary pinions 17 around the teeth of the side gear 16 correspondingly rotating the other side gear 15 and its clutch shell idly in their bearings, imparting no power to the traction wheels; when the clutch is closed the drive is extended in balanced relation to both wheels according to the well understood principle of differentials and the machine can thus be driven about as desired, the speed being controlled by the throttle grip 12 on the right handle bar.

The worm drive requires to be of slow pitch in order to give the necessary speed reduction between the motor and the live axles and such a drive is self-locking against reverse driving, which is to say that except for the clutch, the machine could not be rolled about by hand when the engine is not running. By opening the clutch, at such time, it can be trundled about as desired. The worm gear 14 being then stationary and held by the worm, the left live axle and inner clutch shell will rotate with the left wheel and the right live axle and its side gear 16 will rotate with the right wheel, the planetary pinions and the left side gear and outer clutch shell being driven idly and oppositely thereby; also by opening the clutch, when the engine is running, the machine may be similarly moved by hand.

The location of the clutch so that it intervenes between one of the side gears and the traction wheel driven thereby accomplishes the double purpose of interrupting the motor drive and of permitting easy hand propulsion, and involves the least complication of mechanism and requires the least weight which is of much importance in order to avoid unduly heavy traction pressure on the soft turf as later referred to. The housing of the clutch and differential side by side in adjacent chambers of the same main axle housing further minimizes weight and space and as they are thus in line with the axis of the main wheels, they are balanced so far as load on the handle bars is concerned, but while the described location and relative arrangement are preferred, it will be seen that approximations to the same compactness and simplicity can be had with these parts separately or otherwise located.

The mowing mechanism shown in the drawings comprises a gang of three lawn mower units, each of conventional type having a rotary cutter or fly-knife 35 driven by one or both its ground wheels 36 in coaction with the usual bed knife and the rear end of each unit frame being supported on the lawn by a wiper roller 37, as customary in lawn mowers. The units are arranged in overlapping positions with a single unit in front which operates between the traction wheels and beneath the axle structure 20 to which it is connected, and the two other units placed in rear, one directly behind each traction wheel and overlapping the swath of the front unit.

The means for connecting the front unit to the axle structure comprises a pair of forks 38 vertically depending, as posts from the latter and respectively embracing the end portions of the cross rod 39 of that unit. Such cross rod coincides with the axis of the ground wheels of the unit so that the latter is thus held with such axis confined to the vertical plane of the axle structure, or the axis of the traction wheels, being thus kept always square to the direction of travel, but free to move up and down and oscillate in that plane independently of the traction wheels and in complete accommodation to the undulations of the green. By tipping the handle bars upwards to an abnormal angle the lower ends of the forks can be raised far enough from the ground to permit removal of the unit, after first withdrawing the cross-pins which close the fork slots. The compactness of structure incident to the location of the unit between the traction wheels will be obvious, but it will be understood that where compactness is not important or where the unit is intended to turn horizontally with reference to the axle structure, it will be preferably connected to follow the traction wheels and sufficiently in rear thereof to avoid contact on turning.

The connecting means for the rear units allows each of the latter also to accommodate undulations of the green independently of the main wheels and of the other units, and also to turn in horizontal angles as when steering round a corner. Such means in the present case comprise a rearward draft bracket 41 bolted to the axle structure and provided with an eye 42. The two rear units are yoked together by a draft frame 43 the front end of which is hooked into or to this eye, therewith forming a joint which permits angular movement of the rear units in all directions. The draft frame 43 holds the two units by means of its forks 45 which respectively straddle the ends of each cross rod 44 of the units, and these forks are deep enough, above their closing pins 46, to permit each unit to rock or tilt therein in the vertical plane of its own wheel axis, independently of the frame and of the other units. The normal position of the draft frame is horizontal, due to the location of the joint eye 42 in the end of the downward post on the bracket 41, thus giving an effective draft pull on the rear units. All three units are free to accommodate all conditions of ground surface and direction of travel and always in proper overlapping relation. It will be obvious, however, that other forms of unit-connecting means might also accomplish this same result.

When the machine is to be driven or moved about without mowing, the front unit can be rendered inoperative by stepping on the foot lever 50 which lifts its ground wheels off the ground as shown in Fig. 4. The lifter 50 is fulcrumed on a cross rod 51 on the draft bracket 41 with its forward end extending under the cross rod of the front unit and its rear end provided with a latch 52 to hook to the rear edge of the bracket and thus hold the lever down. When the front unit has been thus raised its rear wiper roller 37 may still rest on the ground and will roll thereon but its rotary fly-knife cutter will not be driven. The rear units also can be similarly rendered inoperative by simply unhooking the draft frame from joint eye 42 and hooking it into an upper eye 53 formed on the draft bracket at a suitable elevation above eye 42. In this position the draft frame 43 will have been rocked on the cross rods 44 of its units until it has engaged with lugs 54, fixed or cast on their frame structures and their ground wheels raised from the ground, as also indicated in Fig. 4. The rear units are then in the same position as the front unit, being partly supported by the frame 43 and partly by their wiper rollers which will roll on the ground. This method of rendering units inoperative is preferable to fly-knife releases or means for lifting the units wholly from the ground, because it requires but little mechanism and practically no extra weight and in the case of a walk type mower puts very little extra load on the operator.

Although the several units are made as light and free-running as possible, their aggregate weight added to the effort required to rotate their respective fly knives, when cutting, that is to say their draft pull, represents a traction load or drag on the tractor mechanism, which may be in the neighborhood of 100 or 120 lbs. and which the latter cannot safely handle if its wheels should be equipped with any such ordinary tires or treads as are customary for power mowers, or as have heretofore been proposed for such mowers. For example, if supplied with ordinary wide metal treads, whether corrugated or not, the wheels will slip on the grass under such a drag, especially if the grass of the green is moist or damp, which is its normal and intended condition, being kept so by sprinkling in the absence of rain, and slipping of course cuts or tears the surface. Obviously cleats or caulks on the treads, intended to prevent such slipping, cannot be used on putting greens, because any deformation of the surface affects the course of a putted ball. And moreover and inasmuch as putting greens are purposely made rolling or undulating, such plain metal treads tend to cut into the high side of a sloping surface thus also deforming the green and at the same time diminishing the traction. Ordinary pneumatic tires will not suffice to haul a gang of units without either rutting the green or slipping and thereby tearing it, as I have many times demonstrated. Putting greens are cultivated so as to be relatively soft and yielding; this is so that the grass will thrive and also so that pitched balls may not bound unduly when they land on it. Such a surface is easily rutted by rolling the ordinary pneumatic tire over it under a weight such as represented by self propelling mechanism. By ordinary pneumatic tires I refer to the common rubber tires inflated to the pressures recommended by the tire makers and dealers and ordinarily used. These do not show any appreciable flattening at the point of ground contact and in fact act on a putting green substantially in the same manner as the metal tire, in that the area of tread contact with the ground is relatively small and the pressure concentrated at the center point of it, which fact causes them to rut the green when they carry the load necessary to give them the traction requisite for overcoming the drag of the mowing mechanism. Moreover rubber slips easily on moist grass, so that if the vertical load is diminished, to avoid rutting, slippage is encountered and the attempt to use such tires results in either one way or the other in marring the green and making it unsuitable or less desirable for putting. As well known, putting greens must be without blemish of any kind.

The difficulty above alluded to is overcome according to this invention by producing a material increase of the area of the tread contact and distributing the contact pressure uniformly over that increased area so that on any square inch it will be less than that which the sensitive surface of the green can support without suffering deformation or injury and this is accomplished in a simple manner by using ordinary rubber tires with the inflation pressure reduced until the pressure per square inch, on the green, is below the point which has been found to result in rutting or slipping. This point is easily determined and may vary with variations in the degree of moisture and undulation of the green, being less as these characteristics increase, but in any event easily and unmistakably recognizable by the operator, who has merely to reduce the inflation pressure (thereby enlarging the tread contact area) until the machine can traverse the green without leaving discoverable deformation. The maximum pressure per square inch, generally permissible on the average green, may be stated as about 15 lbs. which can be ascertained by the use of a standard pressure gage on the valve stem of the tire, since the pressure of the tire on the ground, cannot exceed the pressure of the air on the wall of the tire. The production of a "soft tire" effect to the extent stated involves the coincident advantage that by so doing the tread becomes self-accommodating to lateral slopes; which is to say that the plane of the wheel may be vertical and the surface of the green at a considerable slope from horizontal, yet the bottom of the tire fits the slope and presses no more severely on the high side of it than at the low side of it; the pressure being in all cases uniformly distributed over every unit of tread contact area. The normal or fully inflated tire has practically no lateral accommodation of this kind, no more than the plain metal tire. Recognition and utilization of the principles above described constitute the basic principle of this part of the invention, makes possible the use of gang lawn mowers on putting greens, and is intended to be broadly defined and covered by the claims hereof.

In the particular machine described herein, the weight or vertical load on the traction wheels is about 225 pounds, that is to say, 112.5 pounds on each wheel, and each wheel is provided with a standard 3 x 28 inch or motor cycle tire comprising an inner tube and shoe as usual, and these are inflated only to such pressure, 15 lbs. or less, as is found sufficient to give a pad-like contact of properly extended area for that load. A tire thus under-inflated bulges or squashes out under the vertical load making a splayed contact upon its supporting surface, the area of which measures in its effective portion, at say 12½ pounds pressure, about 6 inches long and 1½ inches wide, and this area is satisfactory for this particular machine under all general conditions, but might be larger for very soft greens. It provides a pressure on each square inch of the green not greater than about 12½ pounds. The tread contact surfaces thus produced fit flat on any ground slope, whether a crosswise or longitudinal slope, or both, and because of this invariable wide-area engagement a friction is produced and maintained between tires and grass which, measured in pounds is greater than the horizontal or drag load represented by the gang of self-actuated lawn mower units, thus avoiding slippage, while by the constantly equal distribution of power, to the two wheels, by the effect of the differential, there is no possibility for either tread contact to carry more of the drag load than its grass friction will sustain without slipping, as for example when making turns. Pneumatic tires of wider dimension and thinner wall section will of course allow of larger grass contact areas, with less danger of so-called rim-cutting, although ordinary standard tires such as herein shown are in every way suitable; and rough or so-called "weather tread" tires are practical so long as the tread projections on them are not so small or sharp as to mark the green.

Approximation to the new result of this invention may be had by the use of other than pneumatic tires provided the same are sufficiently yielding in nature and have the essential quality of making large-area and self-adjusting contacts with the green even though the pressure is not identical on each and every unit of area of the whole area of contact. Such pneumatic substitutes will function imperfectly in the degree that they lack such uniformity, but if the pressure is adequately distributed and at no point exceeds the permitted maximum, such substitutes may nevertheless suffice for some conditions of use and are accordingly included in the scope of the broader claims on this invention.

I claim:

1. The method of mowing putting greens by the use of tractor-propelled lawn mowing mechanism which comprises establishing large tread contacts for all the traction wheels adapted to rest upon varying green slopes with substantially uniform distribution of the pressure over the whole of each area of contact and correlating the size of each contact area to the amount of the load thereon so that the pressure at no point of said area is greater than the sensitive green can support without suffering deformation.

2. The method of mowing putting greens with tractor-propelled lawn mowing mechanism which comprises establishing large tread contacts for all the traction wheels adapted to rest upon undulating green surfaces with substantially uniform distribution of the pressure over the whole area of contact, correlating the size of each contact area to the amount of the vertical load thereon so that the pressure at no point of said area is greater than the sensitive green can support without suffering deformation, and making the total of said tread contact areas of such extent as to produce a total minimum of friction on the green, which minimum is in excess of the horizontal or traction load.

3. A gang lawn mower for mowing putting greens comprising traction wheels having pneumatic tires and mowing mechanism propelled by said wheels, each said tire being inflated only to a low degree whereby the weight thereon flattens and spreads it out on the green surface making a tread contact of large area and uniform pressure per square inch of contact surface, which pressure is not greater than the sensitive green will support without suffering deformation, a propelling motor carried on said wheels and driving gearing whereby said motor imparts substantially equal power to each wheel, and means for steering said wheels.

4. A gang lawn mower for putting greens comprising a pair of traction wheels having pneumatic tires, and supporting an axle structure, a gang of overlapping lawn mower units of the type having ground-engaging wheels driving their respective fly-knives, means movably connecting one of said units to said axle structure between said traction wheels, means movably connecting the other units thereto in positions overlapping the middle unit, a propelling motor carried on said axle structure with drive connections to said traction wheel, the weight of said structure, motor and drive connection being correlated to the inflation pressure of said tires to cause them to spread out producing tread contacts of large area and uniform pressure per square inch on the green, which pressure is not greater than the sensitive green will support without suffering substantial deformation.

5. A gang lawn mower comprising in combination with a pair of traction wheels, a propelling motor supported thereon for driving said wheels, a plurality of overlapping lawn mower units comprising fly-knives, and ground wheels driving said fly-knives, all of said fly-knives being operated solely by the action of their respective ground wheels, means holding one of said units with the axis of its ground wheels substantially in the vertical plane of the axis of said traction wheels, said means being adapted to permit free vertical and rocking movement of said unit in that plane relatively to said traction wheels, and jointed draft means connecting the other of said units to be propelled by said traction wheels and holding them in overlapping relation to the cutting mechanism that is between the traction wheels, the joint of said draft means being in rear of said vertical plane.

6. A gang lawn mower comprising in combination with the axle structure of a pair of traction wheels and a motor on said structure for driving said wheels, a plurality of mutually overlapping lawn mower units respectively comprising fly-knives, ground wheels and gears connecting their ground wheels with their fly-knives for driving the latter, each of said units being operated solely through its ground contact, and one of them being located between said motor-driven traction wheels, means connecting that unit to said axle structure adapted to permit it to move vertically with reference thereto, jointed draft means for the other of said units adapted to maintain the latter in overlapping relation to the unit between the traction wheels and an operator's guide means for said axle structure.

7. A walk-type gang lawn mower comprising in combination with a pair of traction wheels, an axle-housing therefor supporting the propelling motor and containing the drive-connections including a clutch therefor, a plurality of overlapping lawn mower units respectively comprising fly-knives, ground wheels, and gears connecting said ground wheels to said fly-knives, each of said units being operated solely through its ground contact, and one of them being located between said motor-driven traction wheels, means connecting that unit to said housing adapted to permit it to move vertically with reference thereto, jointed draft means for the other of said units adapted to maintain the latter in overlapping relation to the first unit, an operator's guide handle for said traction wheels, and means on the handle to control the clutch in said housing.

8. A gang lawn mower comprising in combination with the axle housing of a pair of traction wheels and a motor on said housing for driving said wheels, a plurality of overlapping lawn mower units respectively comprising fly-knives, ground wheels, and gears connecting their ground wheels with their fly-knives, all of said units being operated solely through their ground contact, means connecting the front unit to said axle structure between said motor-driven traction wheels adapted to permit that unit to move vertically with reference thereto, but holding it square to the direction of travel, jointed draft means for the rear units adapted to maintain the latter in overlapping relation to said front unit with at least one of them being directly behind one of the traction wheels, and an operator's steering means for said traction wheels.

9. A gang lawn mower comprising in combination with a pair of traction wheels having soft tires making tread contacts of extended area under the load imposed thereon, a housing supporting the propelling motor on said wheels, a plurality of overlapping lawn mower units respectively comprising fly-knives, ground wheels smaller than said traction wheels, and gears connecting said ground wheels to said fly-knives, each of said units being operated solely through its ground contact, means connecting one of them to said housing between said traction wheels adapted to permit that unit to move vertically with reference thereto, jointed draft means for the other of said units adapted to maintain the latter in overlapping relation to the first-mentioned unit and an operator's steering means for said traction wheels.

10. A gang lawn mower comprising in combination with a pair of main traction wheels having tires making tread contacts of extended area under the load imposed thereon and with uniformly distributed pressure, an axle housing supporting the propelling motor on said wheels and containing differential drive gearing whereby said motor transmits equal power to each of said wheels, a plurality of overlapping lawn mower units respectively comprising fly-knives, ground wheels, and gears connecting said ground wheels to said fly-knives for driving the latter, each of said units being operated solely through its ground contact, means for movably connecting one of them to said housing adapted to permit that unit to move vertically with reference to said housing, jointed draft means for the other units adapted to maintain them in overlapping relation to the first mentioned unit and an operator's steering means for said traction wheels.

11. A walk-type lawn mower comprising a pair of traction wheels, a housing supporting the propelling motor and the drive connections between the same and said wheels, in combination with lawn mower mechanism and means whereby the same may be hauled by said housing from either a high or a low point of draft connection therewith.

12. A gang lawn mower comprising in combination with the axle structure of a pair of main wheels and a motor on said structure for driving said wheels, a plurality of overlapping lawn mower units respectively comprising fly-knives, ground wheels and gears connecting their ground wheels with their fly-knives, each unit being operated solely by its ground contact, and one of them being located between said motor-driven main wheels, means connecting that unit to said axle structure holding it in the vertical plane thereof and adapted to permit it to move vertically with reference thereto, jointed draft means for the other of said units adapted to maintain the latter in overlapping positions with reference to the first-mentioned unit and including a substantially horizonal draft bracket extending between said main wheels and carrying one of the members of a draft coupling for the other of said units at its extremity.

13. A walk-type gang lawn mower comprising in combination with an axle housing carried on a pair of traction wheels and supporting the propelling motor, a plurality of overlapping lawn mower units respectively comprising fly-knives, ground wheels and gears connecting their ground wheels with their fly-knives, one of said units being located between said motor-driven traction wheels, means connecting that unit to said axle housing adapted to permit it to move vertically with reference thereto, draft means for the other units adapted to maintain the latter in overlapping positions with reference to the first unit and including a bracket extending between said traction wheels and carrying one of the members of a draft coupling, a member on said bracket adapted to hold said first mentioned unit in a non-mowing position, and an operator's guide handle fixed to said axle housing.

14. A walk-type lawn mower comprising in combination with an axle housing carried on a pair of traction wheels and supporting a propelling motor, and drive connections between the same and said wheels, a lawn mower unit comprising a fly-knife, ground wheels and gears connecting the same to the fly-knife, said unit being located between said motor-driven wheels, means connecting said unit to said housing adapted to permit that unit to move vertically with reference thereto, a unit lifter member carried by said housing adapted for lifting the ground wheels of said unit off the ground, and an operator's guide handle for said axle housing.

15. A walk-type lawn mower comprising a pair of traction wheels, a housing supporting a propelling motor and drive connections between the same and said wheels, a guide handle rigidly fixed to said housing, means for connecting a lawn mower unit movably to said housing and a foot-operable lifter for said unit.

16. A walk-type lawn mower comprising a pair of traction wheels, a housing supporting a propelling motor and containing drive connections therefor, a guide handle rigidly fixed to said housing, post-like means rigidly depending from the housing and a lawn mower unit movably held by said means but always square to the direction of travel, said unit having no other connection with the housing save by said means and being easily separated therefrom on raising the guide handle to an abnormal elevation.

17. A walk-type gang lawn mower comprising in combination with a pair of traction wheels, a housing supporting a propelling motor on said wheels and containing drive-connections therefor, a plurality of mutually overlapping lawn mower units respectively comprising fly-knives, ground wheels, and gears connecting said ground wheels to said fly-knives, each of said units being operated solely by its ground contact, means for detachably connecting one of said units to said housing adapted to hold said unit square to the direction of travel but with freedom for independent vertical movement, said means constituting the sole connection between said unit and the housing, an operator's guide handle fixed on said housing and adapted, when raised to an abnormal angle, to swing said connecting means rearwardly for easy removal of said unit, and draft means for the other of said units holding the same in overlapping relation to the first-mentioned unit.

18. Walk-type apparatus of the kind described comprising in combination an axle housing having lawn mower mechanism connected thereto and supported on a pair of traction wheels intended to be moved optionally by power or hand, a propelling motor supported by said housing, drive-connections between said motor and wheels comprising a differential gear system one element of which is connected to one of said wheels, and a clutch controlled by the operator for connecting the opposite element of the differential system to the other traction wheel and an operator's handle on said housing suited for pushing or merely guiding said wheels.

19. Apparatus of the kind described comprising in combination, an axle housing having lawn mowing mechanism connected thereto, a pair of traction wheels, a differential gear system in the housing, a propelling motor supported on the housing, irreversible speed-reducing gearing connecting the motor to the intermediate element of said system, means connecting one of the other elements of said system to one of said traction wheels and a manually controlled clutch connecting the remaining element to the other traction wheel.

20. Walk-type apparatus of the kind described comprising the combination of a pair of traction wheels, an axle structure thereon connected to mowing mechanism and supporting a propelling motor, a worm fast to the power shaft of the latter, an intermediate element of a differential gear system driven by said worm, means connecting one of the other elements of said system to one of the traction wheels, a manually controlled clutch interposed in the line of drive between the remaining element of said system and the other traction wheel, an operator's guide handle and means associated therewith to control the clutch.

21. Walk-type mowing apparatus comprising a pair of traction wheels intended to be moved optionally by power or by hand, a tubular axle housing carried thereby, a bracket thereon, a propelling motor on the bracket, live axles within said housing, a clutch also within the housing, a guide handle rigidly fixed to said housing and adapted for holding the same in normal upright position and means on the handle extending into the housing for controlling the clutch.

22. A walk-type gang lawn mower comprising in combination, a pair of traction wheels having pneumatic tires inflated to not more than ten pounds per square inch, a propelling motor supported thereon, having, with its appurtenant mechanism, such weight as to flatten said tires out to make tread contacts of extended area and so soft as to fit flat on varying slopes of green and exert a pressure on each square inch of green less than would cause substantially noticeable injury to the green, a plurality of mutually overlapping similar lawn mower units drawn by said traction wheels, one of said units being located beneath the axis of said traction wheels and independently vertically movable with reference thereto, and the others being located behind said traction wheels, and an operator's guide handle adapted for supporting the motor in normal position with respect to the axis of said wheels and for guiding the latter.

23. The method of mowing putting greens by means of tractor-propelled, overlapping lawn mower units, which comprises establishing a tread area and pressure contact for each traction wheel adapted to fit flat upon any slope of the green with uniform pressure per unit of area of contact which pressure is not greater than the sensitive green will support without suffering deformation, making the areas of such tread contacts substantially equal and jointly of such extent as to produce a minimum friction on the green in excess of the draft pull of the lawn mower units, and maintaining equal transmission of power from the motor of the tractor to each of said tread contacts.

24. In walk-type apparatus of the kind described, a pair of wheels, a housing supported thereon, a differential and clutch disposed side by side on the axis of said wheels and within the housing, a motor mounted outside the housing to drive said differential and a guiding handle rigidly extended from said housing.

25. A gang lawn mower, comprising the combination with the axle structure of a pair of main wheels, of a central lawn mower unit connected to said structure and free to move vertically in the plane of its own ground wheel axis and independently of the main wheels and with its said axis directly beneath said axle structure and other lawn mower units having jointed connection to said unit and structure, and extending laterally beyond said main wheels, and means for supporting one or more of said units with their ground wheels off the ground and their rear rollers resting on the ground.

26. In a walk-type gang lawn mower, a pair of main wheels, an axle structure supported thereby, a driving motor on said axle structure and handle means on said structure adapted to support it and said motor, in combination with a gang of lawn mower units having cutter-driving ground wheels and means for supporting one or more of said units partly on said axle structure and partly on the ground.

27. A walk-type power gang lawn mower comprising a driving motor supported by the axle structure of a pair of traction wheels, a guiding handle therefor, a gang of overlapping lawn mower units connected with said structure to be propelled thereby and means for supporting one or more of said units on said axle structure, with their ground wheels off the ground and their wiper rollers resting on the ground.

28. A gang lawn mower comprising a pair of main traction wheels, an axle structure supported thereon, a drive motor and guide means for said structure, in combination with a gang of overlapping lawn mower units propelled by said wheels, each having cutter-driving ground wheels and one of them being in the space between said traction wheels and free of any weight or pressure from said axle structure.

29. A power lawn mower comprising an axle housing containing live axles and differential bearing connected to and between the same, means on said housing for movably connecting thereto a lawn mower unit having ground-wheels, said unit being free to rock and rise and fall in approximately the vertical plane of said housing and in a plane below said differential gearing, a motor connected to said differential gearing for driving said axles therethrough and tractor wheels driven by said axles.

30. A walk-type power lawn mower comprising an axle structure in the form of a housing supported on a pair of traction wheels and enclosing a clutch and gearing through which said wheels are driven, unit-propelling means provided on said housing, a lawn mower unit having ground wheels movably held by said means to follow undulations of the ground, a motor on said housing for driving said gearing and propelling the unit, and a walk-type guiding handle for said structure.

31. In a walk-type tractor of the kind described a pair of traction wheels supporting an axle structure containing a differential gear system the axis whereof coincides with the axis of said wheels, a motor on said structure having its crank shaft extending crosswise of said axle structure and provided with a worm directly driving the intermediate element of said system, the side elements of said system being connected to said traction wheels, a manually controlled friction clutch to control the drive of said wheels and a guide handle having means to control said clutch.

32. A walk-type gang lawn mower comprising an axle housing supporting a drive motor and guiding handle means, a pair of traction wheels supporting such housing, tires on said wheels having contact with the ground of extended area and uniform pressure, a clutch and gearing enclosed in said housing connecting said motor and traction wheels, a lawn mower unit having cutter-driving ground wheels movably supported in the space between said traction wheels and like lawn mower units horizontally jointed to follow said center unit in overlapping relation thereto.

In testimony whereof, I have signed this specification.

CHARLES C. WORTHINGTON.